United States Patent
Seidl et al.

(10) Patent No.: US 6,745,213 B2
(45) Date of Patent: Jun. 1, 2004

(54) METHOD AND APPARATUS TO FACILITATE TESTING OF GARBAGE COLLECTION IMPLEMENTATIONS

(75) Inventors: Matthew L. Seidl, Longmont, CO (US); Mario I. Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 316 days.

(21) Appl. No.: 09/992,063

(22) Filed: Nov. 21, 2001

(65) Prior Publication Data

US 2003/0105777 A1 Jun. 5, 2003

(51) Int. Cl.$^7$ ................................ G06F 17/30
(52) U.S. Cl. ...................... 707/206; 707/200
(58) Field of Search ................. 707/206, 200; 711/170, 171, 203, 125, 173; 700/200

(56) References Cited

U.S. PATENT DOCUMENTS

| | | | | |
|---|---|---|---|---|
| 4,989,137 A | * | 1/1991 | Oxley et al. ............... | 711/203 |
| 6,327,701 B2 | * | 12/2001 | Ungar ........................ | 717/125 |
| 2002/0073103 A1 | * | 6/2002 | Bottomley et al. ......... | 707/200 |
| 2003/0084266 A1 | * | 5/2003 | Knippel et al. ............. | 711/173 |
| 2003/0105777 A1 | * | 6/2003 | Seidl et al. ................. | 707/200 |

* cited by examiner

*Primary Examiner*—Diane D. Mizrahi
(74) *Attorney, Agent, or Firm*—Park, Vaughan & Fleming LLP

(57) ABSTRACT

One embodiment of the present mechanism provides a system to facilitate testing of garbage collection implementations. The system operates by first receiving a trace of valid memory transactions at a test harness. This trace of valid memory transactions is replayed through the test harness into a memory manager, which includes a garbage collection implementation under test. The results of replaying this trace are then observed to verify that the garbage collection implementation under test does not erroneously change the contents of the memory.

18 Claims, 3 Drawing Sheets

METHOD AND APPARATUS TO FACILITATE TESTING OF GARBAGE COLLECTION IMPLEMENTATIONS

BACKGROUND

1. Field of the Invention

The present invention relates to garbage collection within computer memory. More specifically, the present invention relates to a method and an apparatus to facilitate testing of garbage collection implementations within a computer memory.

2. Related Art

Many modern computing systems and languages rely upon garbage collectors to reclaim unused storage. A garbage collector relieves the programmer from the task of deallocating storage that is no longer needed for the execution of a program, and thereby makes more efficient use of the memory within the computing system.

While garbage collectors are desired within these computing systems, the garbage collector is frequently one of the largest, and most complex, software modules in the computing system. Errors in the garbage collector, however, may be very difficult to detect because these errors can manifest themselves in other program code that may be executed long after the garbage collector performs the erroneous actions that give rise to the errors. This delay between error occurrence and error manifestation makes debugging and testing garbage collectors a very difficult task. Additionally, errors within a platform-independent virtual machine, or in computer code executing on the platform-independent virtual machine, may cause errors that appear to originate within the garbage collector, thereby causing debugging efforts to be incorrectly allocated.

An additional problem with debugging a garbage collector is that a particular error may manifest itself differently, or in different places in the platform-independent virtual machine. The way an error manifests itself can depend upon non-deterministic factors such as which programs are running on the platform-independent virtual machine or differences in program execution speed caused by non-deterministic interactions with external resources.

What is needed is a method and an apparatus that facilitates testing a garbage collection implementation while eliminating the problems described above.

SUMMARY

One embodiment of the present invention provides a system to facilitate testing of garbage collection implementations. The system operates by first receiving a trace of valid memory transactions at a test harness. This trace of valid memory transactions is replayed through the test harness into a memory manager, which includes a garbage collection implementation under test. The results of replaying this trace are then observed to verify that the garbage collection implementation under test does not erroneously change the contents of the memory.

In one embodiment of the present invention, the trace of valid memory transactions includes memory transactions associated with multiple platform-independent computer programs concurrently executing on a platform-independent virtual machine.

In one embodiment of the present invention, the test harness includes an interface for each entry point into the memory manager.

In one embodiment of the present invention, a second garbage collection implementation under test is substituted for the garbage collection implementation under test.

In one embodiment of the present invention, verifying that the garbage collection implementation under test does not incorrectly change the content of the memory includes comparing the current state of the memory with the recorded state of memory stored with the trace of valid memory transactions.

In one embodiment of the present invention, the trace of valid memory transactions is gathered using a tracing platform-independent virtual machine.

In one embodiment of the present invention, the tracing platform-independent virtual machine is known to operate correctly.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Creating a Trace of Valid Memory Transactions

Figure 1:
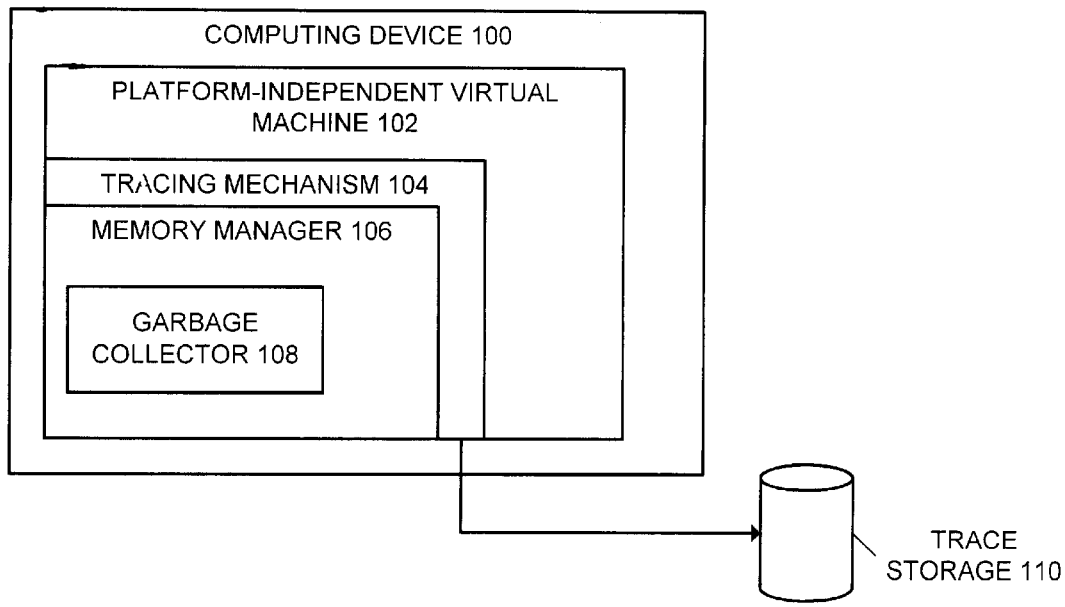
FIG. 1 illustrates computing device 100 including platform-independent virtual machine 102 in accordance with an embodiment of the present invention.

FIG. 1 illustrates computing device 100, including platform-independent virtual machine 102, in accordance with an embodiment of the present invention. Computing device 100 can generally include any type of computer system, including, but not limited to, a computer system based on a microprocessor, a mainframe computer, a digital signal processor, a portable computing device, a personal organizer, a device controller, and a computational engine within an appliance.

Platform-independent virtual machine 102 includes memory manager 106 and garbage collector 108. Platform-independent virtual machine 102, memory manager 106, and garbage collector 108 are known to operate correctly. Platform-independent virtual machine 102 has been transformed into a tracing platform-independent virtual machine by the addition of tracing mechanism 104 at the interface between platform-independent virtual machine 102 and memory manager 106.

Tracing mechanism 104 monitors all memory transactions between platform-independent virtual machine 102 and memory manager 106. Additionally, tracing mechanism 104 monitors the state of memory in response to transactions from platform-independent virtual machine 102 and in response to garbage collection cycles by garbage collector 108. Tracing mechanism 104 stores these valid memory transactions and results in trace storage 110. In one implementation of the present invention, tracing mechanism 104 captures all read transactions from memory manager 106 and the returned results of these read operations and stores both the read transactions and the returned results in trace storage 110.

Trace storage 110 can include any type of system for storing data in non-volatile storage. This includes, but is not limited to, systems based upon magnetic, optical, and magneto-optical storage devices, as well as storage devices based on flash memory and/or battery-backed up memory.

Garbage collector 108 periodically reclaims unused storage that was allocated by platform-independent programs running on platform-independent virtual machine 102. Triggering a garbage collection cycle is a well-known procedure in the art and will not be discussed further herein. Tracing mechanism 104 monitors changes in memory caused by garbage collector 108 and stores the results in trace storage 110.

Replaying a Trace of Valid Memory Transactions

Figure 2:
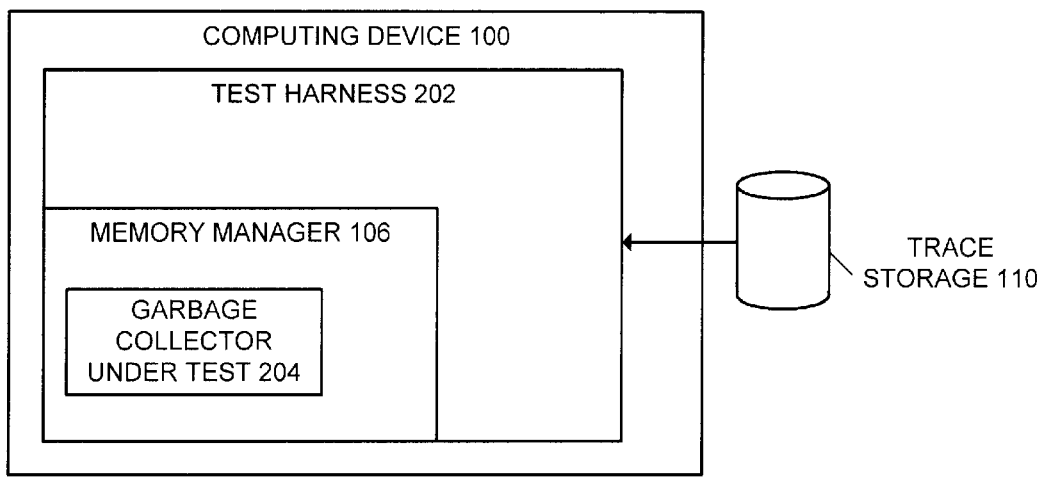
FIG. 2 illustrates computing device 100 including test harness 202 in accordance with an embodiment of the present invention.

FIG. 2 illustrates computing device 100 including test harness 202 in accordance with an embodiment of the present invention. Test harness 202 includes the interfaces normally found between platform-independent virtual machine 102 and memory manager 106. Test harness 202 receives the trace of valid memory transactions from trace storage 110 and replays this trace of valid memory transaction into memory manager 106.

Memory manager 106 includes garbage collector under test 204. Any garbage collector that has the same interface as garbage collector 108 may be plugged into memory manager 106 as garbage collector under test 204, thereby making test harness 202 a useful tool for testing many implementations of garbage collectors.

Test harness 202 monitors the memory transactions caused by the trace of valid memory transactions and the actions of garbage collector under test 204 to verify that garbage collector under test 204 provides the same, correct, data as garbage collector 108. Testing with a trace of valid memory transactions instead of actual virtual machine execution simplifies the debugging process, because it removes all other causes of error, and focuses on only the garbage collection system.

Test Harness 202

Figure 3:
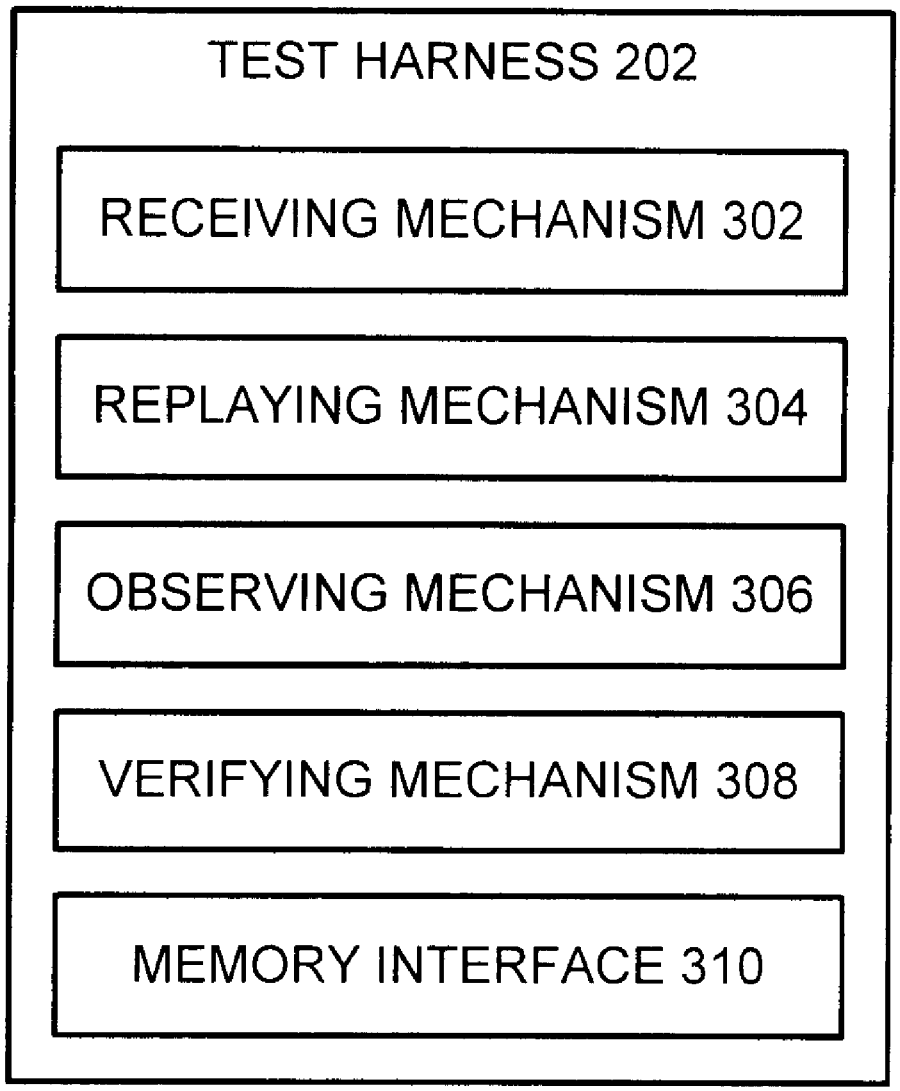
FIG. 3 illustrates test harness 202 in accordance with an embodiment of the present invention.

FIG. 3 illustrates test harness 202 in accordance with an embodiment of the present invention. Test harness 202 includes receiving mechanism 302, replaying mechanism 304, observing mechanism 306, verifying mechanism 308, and memory interface 310.

In operation, receiving mechanism 302 receives the trace of valid memory transactions from trace storage 110. Replaying mechanism 304 replays these valid memory transactions through memory interface 310 into memory manager 106 to provide known changes to the memory so that garbage collector under test 204 has a known memory state.

Observing mechanism 306 observes the results of garbage collector under test 204 operating on the memory. Verifying mechanism 308 verifies that the observed state of the memory is correct after garbage collection operations by garbage collector under test 204. Memory interface 310 duplicates the interfaces between platform-independent virtual machine 102 and memory manager 106, thereby allowing the trace of valid memory transactions to test each interface with memory manager 106 and garbage collector under test 204.

Testing a Garbage Collector

Figure 4:
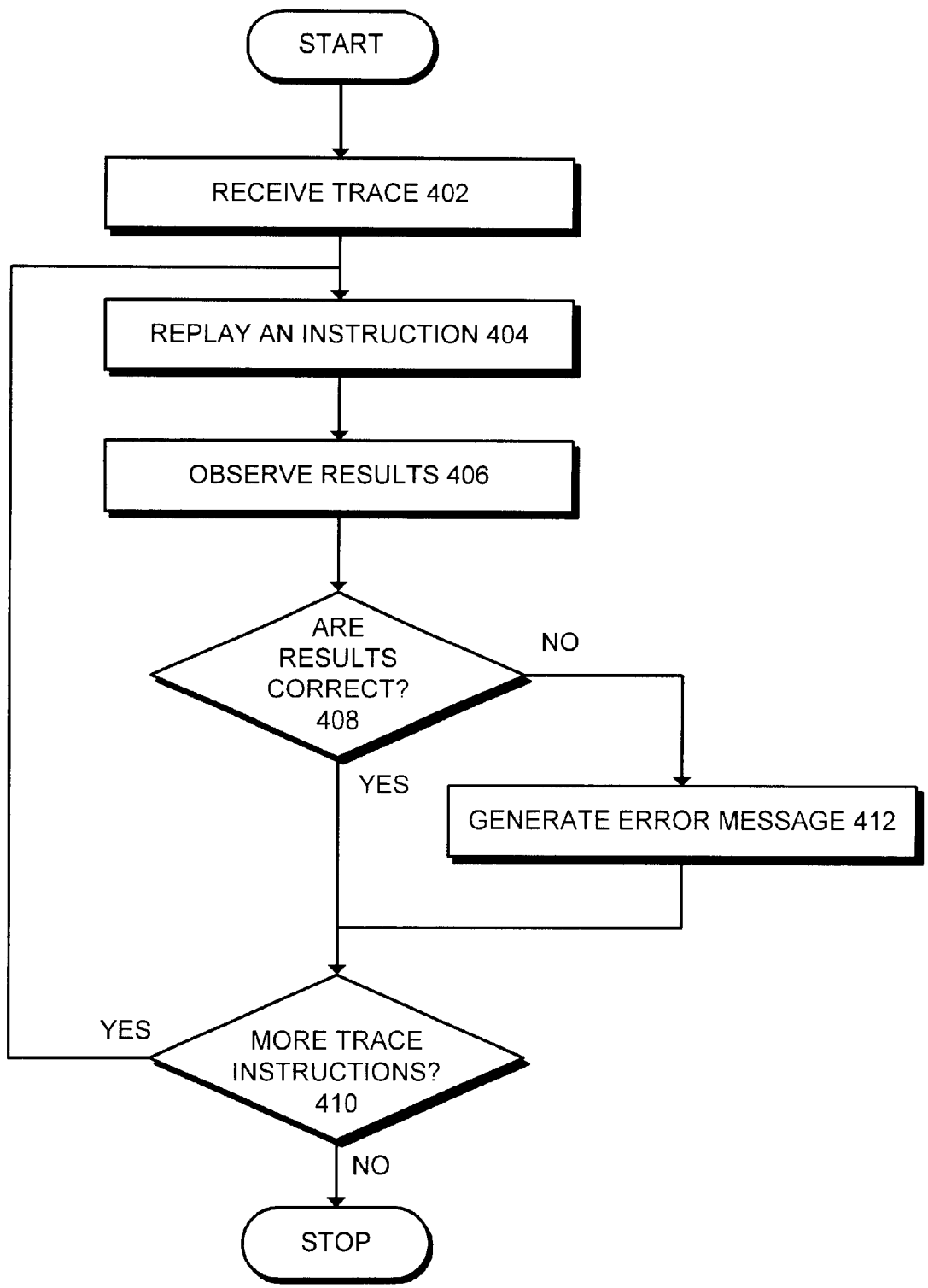
FIG. 4 is a flowchart illustrating the process of testing a garbage collector in accordance with an embodiment of the present invention.

FIG. 4 is a flowchart illustrating the process of testing a garbage collector in accordance with an embodiment of the present invention. The system starts when receiving mechanism 302 receives a trace of valid memory transactions from trace storage 110 (step 402). Next, replaying mechanism 304 replays an instruction from the trace of valid memory transactions through memory interface 310 (step 404).

Observing mechanism then observes the results of the instruction and operations by garbage collector under test 204 (step 406). Verifying mechanism 308 determines if these results are correct by comparing the results with the known results from trace storage 110 (step 408). In one embodiment of the present invention, trace storage 110 includes the read transactions from memory manager 106 and the results of these read transactions. Verifying mechanism 308 compares the results of the replayed read transactions with the results of the read transactions stored in trace storage 110. If the results are incorrect at 408, indicating an error in garbage collector under test 204, test harness 202 generates an error message (step 412).

After verifying the results as correct at 408 or after generating an error message at 412, test harness 202 determines if there are any more instructions in the trace of valid memory instructions (step 410). If so, the system returns to 404 to continue processing instructions, otherwise, the process is ended.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate testing of garbage collection implementations, comprising:

receiving a trace of valid memory transactions at a test harness, wherein the trace of valid memory transactions was gathered using a tracing platform-independent virtual machine and a known good garbage collection implementation;

replaying the trace of valid memory transactions through the test harness into a memory manager, wherein the memory manager includes a garbage collection implementation under test;

observing a result of replaying the trace of valid memory transactions on a memory; and verifying that the garbage collection implementation under test does not erroneously change a content of the memory.

2. The method of claim 1, wherein the trace of valid memory transactions includes memory transactions associated with a plurality of platform-independent computer programs executing on a platform-independent virtual machine.

3. The method of claim 1, wherein the test harness includes an interface for each entry point into the memory manager.

4. The method of claim 1, wherein a second garbage collection implementation under test is substituted for the garbage collection implementation under test, whereby multiple garbage collection implementations may be tested.

5. The method of claim 1, wherein verifying that the garbage collection implementation under test does not erroneously change the content of the memory includes comparing a current state of the memory with a recorded state of memory stored with the trace of valid memory transactions.

6. The method of claim 1, wherein the tracing platform-independent virtual machine is known to operate correctly.

7. A computer-readable storage medium storing instructions that when executed by a computer cause the computer to perform a method to facilitate testing of garbage collection implementations, the method comprising:

receiving a trace of valid memory transactions at a test harness, wherein the trace of valid memory transactions was gathered using a tracing platform-independent virtual machine and a known good garbage collection implementation;

replaying the trace of valid memory transactions through the test harness into a memory manager, wherein the memory manager includes a garbage collection implementation under test;

observing a result of replaying the trace of valid memory transactions on a memory; and verifying that the garbage collection implementation under test does not erroneously change a content of the memory.

8. The computer-readable storage medium of claim 7, wherein the trace of valid memory transactions includes memory transactions associated with a plurality of platform-independent computer programs executing on a platform-independent virtual machine.

9. The computer-readable storage medium of claim 7, wherein the test harness includes an interface for each entry point into the memory manager.

10. The computer-readable storage medium of claim 7, wherein a second garbage collection implementation under test is substituted for the garbage collection implementation under test, whereby multiple garbage collection implementations may be tested.

11. The computer-readable storage medium of claim 7, wherein verifying that the garbage collection implementation under test does not erroneously change the content of the memory includes comparing a current state of the memory with a recorded state of memory stored with the trace of valid memory transactions.

12. The computer-readable storage medium of claim 7, wherein the tracing platform-independent virtual machine is known to operate correctly.

13. An apparatus to facilitate testing of garbage collection implementations, comprising:

a receiving mechanism that is configured to receive a trace of valid memory transactions at a test harness, wherein the trace of valid memory transactions was gathered using a tracing platform-independent virtual machine and a known good garbage collection implementation;

a replaying mechanism that is configured to replay the trace of valid memory transactions through the test harness into a memory manager, wherein the memory manager includes a garbage collection implementation under test;

an observing mechanism that is configured to observe a result of replaying the trace of valid memory transactions on a memory; and a verifying mechanism that is configured to verify that the garbage collection implementation under test does not erroneously change a content of the memory.

14. The apparatus of claim 13, wherein the trace of valid memory transactions includes memory transactions associated with a plurality of platform-independent computer programs executing on a platform-independent virtual machine.

15. The apparatus of claim 13, wherein the test harness includes an interface for each entry point into the memory manager.

16. The apparatus of claim 13, wherein a second garbage collection implementation under test is substituted for the garbage collection implementation under test, whereby multiple garbage collection implementations may be tested.

17. The apparatus of claim 13, further comprising a comparing mechanism that is configured to compare a current state of the memory with a recorded state of memory stored with the trace of valid memory transactions.

18. The apparatus of claim 13, wherein the tracing platform-independent virtual machine is known to operate correctly.

* * * * *